United States Patent [19]

Seymour et al.

[11] Patent Number: 4,526,940
[45] Date of Patent: Jul. 2, 1985

[54] HYDROXYL TERMINATED POLYFUNCTIONAL EPOXY CURING AGENTS

[75] Inventors: John P. Seymour, Fishkill, N.Y.; John A. Gannon, Danbury, Conn.

[73] Assignee: Ciba-Geigy Corporation, Ardsley, N.Y.

[21] Appl. No.: 628,118

[22] Filed: Jul. 5, 1984

Related U.S. Application Data

[63] Continuation of Ser. No. 464,087, Feb. 9, 1983, abandoned, which is a continuation-in-part of Ser. No. 386,142, Jun. 7, 1982, abandoned.

[51] Int. Cl.$^3$ .................. C08G 59/14; C08L 63/02
[52] U.S. Cl. .................. 525/526; 525/524; 528/94; 528/98; 528/99; 528/103
[58] Field of Search .............. 528/103, 99, 98, 94; 525/526, 524

[56] References Cited

U.S. PATENT DOCUMENTS

| 2,884,406 | 4/1959 | Wegler et al. | 528/103 |
| 2,951,825 | 9/1960 | Reinking et al. | 528/99 |
| 3,409,497 | 11/1968 | Roseland | 525/526 |
| 3,477,990 | 11/1969 | Dante et al. | 528/89 |
| 3,914,504 | 10/1975 | Weldy | 528/99 |
| 3,931,109 | 1/1976 | Martin | 525/507 |
| 4,288,565 | 9/1981 | Lohse et al. | 525/526 |
| 4,322,456 | 3/1982 | Martin | 427/195 |

FOREIGN PATENT DOCUMENTS

| 17900 | 2/1974 | Japan | 528/94 |

Primary Examiner—John C. Bleutge
Assistant Examiner—Robert E. L. Sellers, II
Attorney, Agent, or Firm—Luther A. R. Hall

[57] ABSTRACT

A polyglycidyl derivative of an aromatic diamine, aminophenol, or polyphenol and a diglycidyl ether of a bisphenol are reacted with a bisphenol, in the presence of a catalyst at elevated temperature, to yield a reaction product wherein each glycidyl group is effectively endcapped with a moiety containing a free hydroxyl group. The ratio of equivalents of polyglycidyl compound to diglycidyl compound is 1 to 4 to 1 to 1, and of bisphenol to total glycidyl compounds is 1.8 to 1 to 2.4 to 1. Said product is useful for curing solid epoxy resins. The epoxy resins cured by said product have a dense crosslinked network resulting in concomitant superior coating properties especially chemical resistance while maintaining good flexibility.

20 Claims, No Drawings

HYDROXYL TERMINATED POLYFUNCTIONAL EPOXY CURING AGENTS

This application is a continuation of application Ser. No. 464,087, filed Feb. 9, 1983, now abandoned, which is a continuation-in-part application of application Ser. No. 386,142, filed on June 7, 1982, now abandoned.

BACKGROUND OF THE INVENTION

The instant invention pertains to polyfunctional phenolic hydroxyl terminated hardener products and to curable solid epoxy resin compositions containing said hardeners.

The reaction of epoxy resins with phenolic hydroxy-containing compounds in the presence of a catalyst is well known in the art. This reaction is typified by the reaction of bisphenol A (=BPA or 4,4'-isopropylidenediphenol) with liquid BPA epoxy resins to form solid high molecular weight products.

U.S. Pat. No. 3,931,109 teaches the termination of basic liquid BPA epoxy resins as well as epoxy novolac resins with bisphenol A to give phenolic hydroxyl terminated hardeners.

U.S. Pat. No. 3,931,109 also teaches curable compositions of liquid epoxy resins containing a dispersion of a solid phenolic hydroxyl terminated hardener therein.

The instant polyfunctional phenolic hydroxyl terminated hardener products are superior to the hardeners described in U.S. Pat. No. 3,931,109 in respect to curing solid epoxy resins to cured products with outstanding properties particularly in regards to chemical resistance. This is especially of value in the field of coatings.

The products of this invention are useful as curing agents for epoxy resins. When these items are combined with di- and polyepoxide resins and cured at elevated temperatures (e.g. 180° C.) a dense crosslinked network is established which produces superior protective coatings. These coatings, when applied by electrostatic techniques and properly cured to produce thin films, excel in chemical resistance while maintaining flexibility.

The reason these multifunctional hardeners produce their extremely good chemical resistance is through formation of a dense crosslinked reticulum in the final cured coating. The difunctional BPA terminated hardeners form linear extensions, while the multifunctional BPA terminated curing agents produce a web-like structure. This three dimensional network provides the tight barrier by which the cured final coating strongly resists any chemical attack.

The reaction of hydroxyl groups with liquid epoxy resins to form higher molecular weight epoxy resins is described by H. Lee and K. Neville, "Handbook of Epoxy Resins", McGraw Hill, 1967, New York, pp. 2-6 , 2-9. Chapter 2 of Lee and Neville's "Handbook of Epoxy Resins" is devoted to the "Synthesis of Glycidyl-Type Epoxy Resins". This chapter describes the synthesis of high molecular weight epoxy resins based on many types of alcohols.

U.S. Pat. No. 4,322,456 discloses powder coating compositions consisting of an epoxy resin, a phenolic hardener and a catalyst for effecting reaction between said resin and said hardener.

The instant polyfunctional phenolic hydroxyl terminated hardener products are superior to the hardeners described in U.S. Pat. No. 4,322,456 in respect to curing solid epoxy resins to cured products with outstanding properties particularly in respect to chemical resistance while maintaining flexibility.

U.S. Pat. No. 4,288,565 pertains to epoxy molding compositions wherein triphenols such as 1,1,3-tris(4-hydroxyphenyl)propane are used as the phenolic hardener component. While both the instant hardeners and those of this reference have three or more phenolic groups per molecule, the remainder of the respective hardener molecules differ widely. The prior art hardener is a relatively small molecule with the terminal phenolic hydroxy groups attached to the backbone trimethylene-(=propane) chain at very close intervals. While this does not interfere with the hardening efficacy of the molecule, the cured epoxy resin is a relatively rigid and inflexible structure due to the high crosslink density (nearness together of the original phenolic hydroxyl groups).

By contrast the instant hardeners, wherein the terminal phenolic hydroxyl groups are relatively far removed from one another with a relatively bulky linking group therebetween, permit good curing since the efficacy of the phenolic hydroxyl groups is undiminished. However, a lower crosslink density is obtained leading to a concomitant increase in flexibility without loss of chemical resistance.

The preponderance of hydroxyl groups present in the instant hardeners also allows for improved adhesion of epxoy resin cured thereby.

OBJECTS OF THE INSTANT INVENTION

One object of the instant invention is a polyfunctional phenolic hydroxyl terminated product useful as hardener in the curing of solid epoxy resins.

A second object of the instant invention is a curable composition comprising a solid epoxy resin and a polyfunctional phenolic hydroxyl terminated hardener of this invention.

Still another object of this invention is a cured composition having superior properties prepared by curing a composition comprising a solid epoxy resin and a polyfunctional phenolic hydroxyl terminated hardener of this invention.

DETAILED DISCLOSURE

The instant invention pertains to a polyfunctional phenolic hydroxyl terminated hardener product, useful in the curing of epoxy resins, which is the reaction product of (a) a polyglycidyl compound of the formula I, II, III or IV.

$$T_1[-N(glycidyl)_2]_2, \qquad (I)$$

$$T_2 \diagdown_{O-glycidyl}^{N(glycidyl)_2} \qquad (II)$$

$$T_3(-O-glycidyl)_{3 \text{ or } 4} \text{ or} \qquad (III)$$

$$T_4(glycidyl)_3 \qquad (IV)$$

wherein $T_1$ is 1,2-phenylene, 1,3-phenylene, 1,4-phenylene or

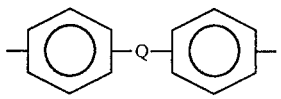

where Q is alkylene of 1 to 6 carbon atoms, alkylidene of 2 to 6 carbon atoms, —$SO_2$—, —SO—, —S—, —S—S—, —O— or —CO—, $T_2$ is 1,2-phenylene, 1,3-phenylene or 1,4-phenylene, $T_3$ is 1,2,3-benzenetriyl, 1,2,4-benzenetriyl, 1,3,5-benzenetriyl or

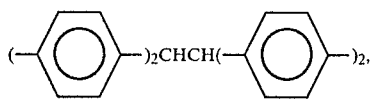

$T_4$ is

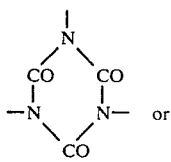

or

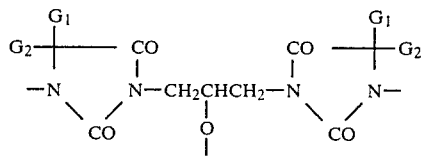

where $G_1$ and $G_2$ are independently alkyl of 1 to 6 carbon atoms or are together alkylene of 4 to 5 carbon atoms, and (b) a diglycidyl compound of the formula glycidyl—O—E—O—glycidyl where E is 1,2-phenylene, 1,3-phenylene, 1,4-phenylene or L where L is a direct bond, alkylene of 1 to 6 carbon atoms or alkylidene of 2 to 6 carbon atoms, wherein the ratio of equivalents of polyglycidyl compound (a) to diglycidyl compound (b) is from 1 to 4 to 1 to 1, with (c) a bisphenol of the formula

HO—$E_1$—OH where $E_1$ has the same definitions as E, but is independent of E, wherein the ratio of equivalents of bisphenol component (c) to the total equivalents of glycidyl compounds (a) plus (b) is from 1.8 to 1 to 2.4 to 1, and where each glycidyl group is effectively endcapped with a moiety containing a free phenolic hydroxyl group by reaction of components (a) and (b) with (c) in the presence of an effective amount of a catalyst for promoting said reaction at a temperature between 120° and 300° C.

Another aspect of the instant invention relates to curable compositions comprising (A) a solid epoxy resin having more than one 1,2-epoxy group, (B) a polyfunctional phenolic hydroxyl terminated epoxy hardener product of the instant invention or mixtures thereof, and (C) a catalytic amount of a catalyst effective in causing reaction between the epoxy groups of (A) and the phenolic hydroxyl groups of (B), wherein the epoxy resin (a) and the hydroxyl terminated hardener (b) are employed in such quantities as to provide a final cured product exhibiting both flexibility and chemical resistance.

These curable compositions have an equivalent ratio of epoxy groups of the epoxy resin of component (A) to phenolic hydroxyl groups of the hardener product of component (B) in the range of 1:0.4 to 1:1.2; preferably of 1:0.5 to 1:0.8; and most preferably of 1:0.65 to 1:0.75.

A further aspect of the instant invention pertains to cured epoxy resin compositions prepared from the curable compositions of the instant invention. Such cured compositions find utility in a host of end-use applications including moldings and electrical uses, but it is particularly in the field of coatings that the instant cured compositions find their most important use. The properties of such cured coatings are excellent, especially in regards to chemical resistance, flexibility and adhesion.

The polyfunctional phenolic hydroxyl terminated hardeners of the instant invention are prepared by reaction of a polyglycidylated aromatic diamine, aminophenol, polyphenol with functionality more than 2 or heterocyclic nitrogen compound and a diglycidyl ether of a bisphenol with a bisphenol in such amounts that about two equivalents of bisphenol are reacted with each equivalent of glycidyl moiety leading to the instant compounds containing phenolic end groups on each original glycidyl moiety.

These polyglycidylated compounds (a) are in many cases items of commerce or may be prepared in a conventional glycidylation reaction with epichlorohydrin and the commercially available aromatic diamines, aminophenols, polyphenols or heterocyclic nitrogen compounds.

$T_1$ is derived from aromatic diamines such as o-, m- or p-phenylenediamine or the diamines of the formula

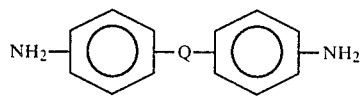

where Q is alkylene of 1 to 6 carbon atoms, alkylidene of 1 to 6 carbon atoms, —$SO_2$—, —SO—, —S—, —S—S—, —O— or —CO—.

Preferably $T_1$ is 1,3-phenylene, 1,4-phenylene or

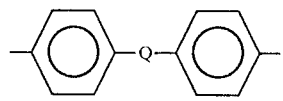

where Q is methylene or —O—. Most preferably $T_1$ is

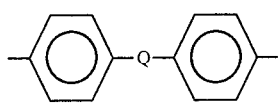

where Q is methylene.

$T_2$ is derived from o-, m- and p-aminophenols. Preferably $T_2$ is 1,4-phenylene.

$T_3$ is derived from polyfunctional phenols having a functionality of 3 or 4. These polyphenols include phloroglucinol, pyrogallol, 1,2,4-benzenetriol and 1,1,2,2-tetrakis(4-hydroxyphenyl)ethane.

Preferably $T_3$ is

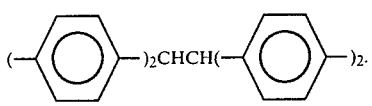

$T_4$ is derived from nitrogen heterocyclic compounds including triglycidyl isocyanurate or triglycidyl bishydantoins of the formula

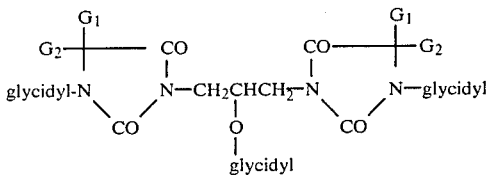

where $G_1$ and $G_2$ are independently alkyl of 1 to 6 carbon atoms, preferably methyl, or $G_1$ and $G_2$ are together alkylene of 4 to 5 carbon atoms.

Preferably $T_4$ is derived from triglycidyl isocyanurate.

The diglycidylated derivatives of bisphenols are also items of commerce or may be prepared by the conventional glycidylation reaction with epichlorohydrin and commercially available bisphenols.

The diglycidylated compounds (b) have the formula glycidyl—O—E—O—glycidyl and are derived, for example, from catechol, resorcinol, hydroquinone, o,o'-biphenol, p,p'-biphenol, bis(2-hydroxyphenyl)methane, bis(4-hydroxyphenyl)methane and 2,2-bis(4-hydroxyphenyl)propane. E is thus 1,2-phenylene, 1,3-phenylene, 1,4-phenylene or

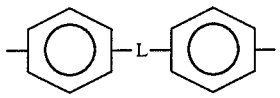

where L is a direct bond, alkylene of 1 to 6 carbon atoms or alkylidene of 2 to 6 carbon atoms.

Preferably E is

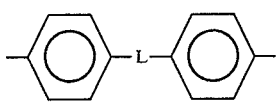

where L is isopropylidene.

The bisphenols (c) have the formula

HO—E₁—OH where $E_1$ has the same definitions as E given above, but E and $E_1$ are independent of one another. Examples of suitable bisphenols are delineated supra.

The reaction of the polyglycidylated and diglycidylated compounds with the bisphenol to make the instant polyfunctional phenolic hydroxyl terminated hardener is carried out in the presence of a catalytic amount of a catalyst effecting the reaction between an epoxy or glycidyl group and a phenolic hydroxyl group.

Suitable catalysts which are employed to effect the reaction between the glycidyl group and the phenolic hydroxyl groups include the phosphonium salts of organic and inorganic acids, imidazoles, imidazolines, quaternary ammonium compounds and the like. Any catalyst which will effectively promote the reaction between a 1,2-epoxide group and a phenolic hydroxyl group can suitably be employed in the present invention.

The catalysts are generally employed in quantities of from about 0.001% to about 10% and preferably from about 0.05% to about 5% by weight based upon the combined weight of the reactants, i.e. the weight of glycidyl-containing compound plus the weight of the phenolic hydroxyl-containing compound.

The inorganic and organic phosphonium compounds which are employed in the process of the present invention, as catalysts, include phosphonium salts of an acid, acid ester or ester of an element selected from the group consisting of carbon, nitrogen, phosphorus, sulfur, silicon, chlorine, bromine, iodine and boron which are represented by the general formula:

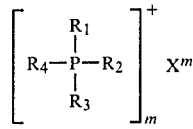

wherein $R_1$, $R_2$, $R_3$ and $R_4$ are independently selected from the group consisting of hydrogen, aliphatic hydrocarbon radicals containing from about 1 to 20 carbon atoms, aromatic hydrocarbon radicals, alkyl substituted aromatic hydrocarbon radicals and radicals represented by the formula —$R_5$—Y wherein $R_5$ is an aliphatic hydrocarbon radical having from about 1 to about 20 carbon atoms and Y is a member selected from the group consisting of Cl, Br, I, $NO_2$, H and OH and where X is the anion portion of an acid, ester or acid ester of an element selected from carbon, nitrogen, phosphorus, sulfur, silicon, chlorine, bromine, iodine and boron and wherein m is the valence of the anion X.

Particularly suitable catalysts include ethyltriphenyl phosphonium iodide, ethyltriphenyl phosphonium chloride, ethyltriphenyl phosphonium thiocyanate, ethyltriphenyl phosphonium acetate acetic acid complex, tetrabutyl phosphonium iodide, tetrabutyl phosphonium bromide, and tetrabutyl phosphonium acetate acetic acid complex.

These and other phosphonium catalysts are more fully described in U.S. Pat. No. 3,477,990 and U.S. Pat. No. 3,341,580.

Suitable imidazoles which may be employed as catalysts in the present invention include, for example, 2-styrylimidazole, 1-benzyl-2-methylimidazole, 2- methylimidazole, 2-butylimidazole, mixture thereof and the like. These and other suitable catalysts are disclosed in Lee and Neville, "Handbook of Epoxy Resins", McGraw Hill, 1967, New York, pp. 11-14.

The imidazole catalysts are particularly preferred in the preparation of the instant hardeners.

It is noted that the catalysts described above which are useful in the preparation of the instant hardeners are the very same catalysts which may be used as component (C) in the curable compositions of the instant invention.

These curable compositions comprise (A) a solid epoxy resin having more than one 1,2-epoxy group, (B) a polyfunctional phenolic hydroxyl terminated epoxy hardener of this invention, and (C) a catalytic amount of a catalyst effective in causing reaction between the epoxy groups of (A) and the phenolic hydroxyl groups of (B).

Suitable solid epoxy resins which are employed as component (a) in the present invention include the aromatic based epoxy resins represented by the following general formulae including mixtures thereof.

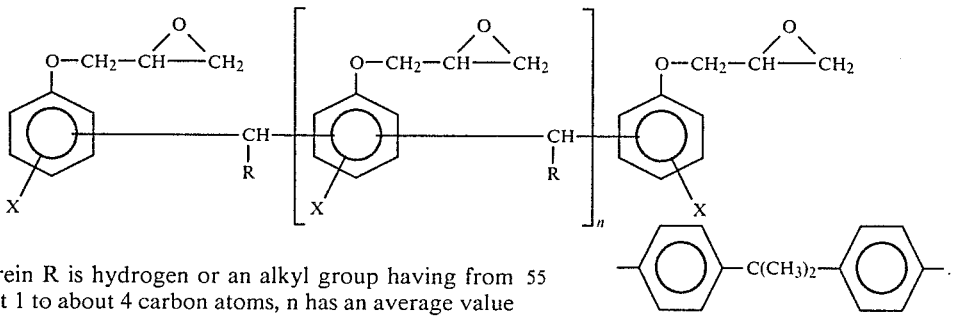

wherein A is a divalent hydrocarbon group having from about 1 to about 6 carbon atoms,

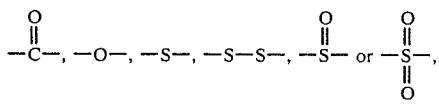

each X is independently hydrogen, chlorine or bromine, and n has an average value of from about 1 to about 12 and preferably from about 3 to about 7.

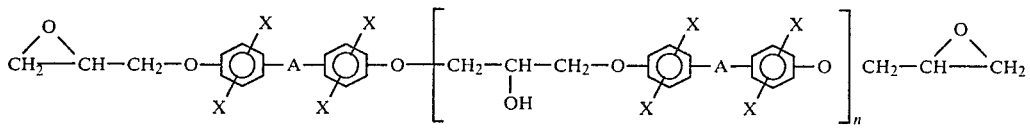

wherein R is hydrogen or an alkyl group having from about 1 to about 4 carbon atoms, n has an average value of from about 0 to about 8, and X is hydrogen, chlorine, bromine or a lower alkyl group having from 1 to about 4 carbon atoms.

The epoxy resins employed in the present invention may be prepared by any of the well known methods such as the reaction of a bisphenolic compound with an epihalohydrin in the presence of suitable catalysts or by the reaction of a liquid polyepoxide with a bisphenol in the presence of such compounds as quaternary ammonium compounds, tertiary amines, phosphonium compounds and the like. These methods are discussed in Chapter 2 of Handbook of Epoxy Resins by Lee and Neville, McGraw Hill Book Co., 1967 and in U.S. Pat. No. 3,477,990.

Any solid aromatic based epoxy resin which has more than one 1,2-epoxy group is suitable for use in the present invention.

Suitable hardeners which may be used as component (B) in the instant invention are the polyfunctional phenolic hydroxyl terminated hardeners described above and being the reaction product of a polyglycidyl compound of formula I, II, III or IV, a diglycidylated compound of formula glycidyl—O—E—O—glycidyl, and a bisphenol of formula HO—E$_1$—OH.

Preferably, component (B) is a hardener derived from a polyglycidyl compound of formula I, II or III where T$_1$ is

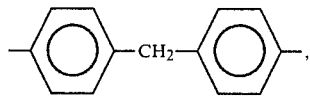

T$_2$ is 1,4-phenylene, T$_3$ is

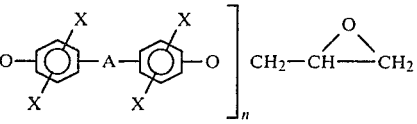

from a diglycidyl compound and from a bisphenol where E and E$_1$ are respectively both

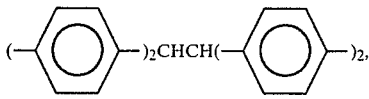

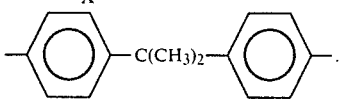

Those skilled in the art will readily recognize the ratio of epoxy compound to phenolic hydroxyl-containing compound required to produce a product of desired molecular weight or simple experimentation can be employed to arrive at the desirable ratio for any desired molecular weight.

The instant curable compositions may find utility in a host of end-use applications including moldings and electrical uses. However, it is in the field of powder coatings that these curable compositions find their most advantageous use.

The instant curable compositions may contain, if desired, dyes, pigments, flow aids and other suitable additives. The compositions in powder form may be used to coat suitable substrates by depositing said powder on the substrate followed by subsequent heating of the powder coated substrate to effect the catalyzed curing reaction between the solid epoxy resin, component (A), and the polyfunctional phenolic hydroxyl terminated hardener, component (B), in the presence of the catalyst, component (C).

The curing reaction is effected by heating the coated substrate to effect the reaction between (A) and (B) usually between about 120° to about 300° C. and preferably from about 140° C. to about 300° C. for from about 10 seconds to about 60 minutes and preferably from about 10 seconds to about 30 minutes or applying said composition to a substrate preheated to a temperature of from about 120° to about 300° C., preferably from about 140° C. to about 300° C., the cure thereby being obtained by the transfer of heat from the heated substrate to the coating.

The substrates which are employed in the process of the present invention are metallic substrates such as steel, aluminum, etc. but any substrate which will withstand temperatures of at least about 130° C. can be employed.

Pigments, fillers, dyes, flow control agents and other modifier compounds may also be employed in the coating compositions employed in the coating process or method of the present invention.

In the present invention, the coated substrates are subjected to temperatures which will effect the reaction between the epoxy resin and the phenolic hydroxyl containing compound. The time employed is of course, dependent upon the temperature, the mass of the coated substrate, etc. For example, thin metallic substrates subjected to a temperature of 300° C. would require only a few seconds to effect and complete the reaction whereas automobile bodies subjected to a temperature of 120° C. would require upwards to 60 minutes to effect and complete the reaction between the epoxy resin and the phenolic hydroxyl-containing compound.

The coatings of the present invention can be employed as coatings for such articles as automobiles, machinery, appliances, containers and the like.

The following examples are presented for the purpose of illustration only and are not to be construed to limit the nature or scope of the instant invention in any manner whatsoever.

PREPARATION OF THE HYDROXYL TERMINATED CURING AGENTS

Example 1

A three-necked round-bottomed flask equipped with a heating mantle, mechanical stirrer, thermometer, and nitrogen inlet tube is charged with 66.5 g (0.627 eq.) of N,N,O-triglycidyl-p-aminophenol, 141.25 g (0.743 eq.) of 2,2-bis(4-glycidyloxyphenyl)propane (or the diglycidyl ether of bisphenol A, equivalent weight is 190), 285 g (2.5 eq.) of bisphenol A, and 40 ppm of 2-isopropylimidazole.

The flask and contents are heated to 100° C. and held at that temperature for one hour, after which the temperature is increased to 125° C. and held for another hour. The 25° C. increments with a subsequent hold at temperature for one hour are continued until the reaction temperature of 175° C. is reached. The flask and contents are held at 175° C. for two hours. The flask is discharged after two hours and the reaction product is cooled to room temperature. The hydroxyl terminated product is then characterized by a Gardner-Holdt viscosity at 25° C. of U-V (ASTM D-445), a melting point of 102°–103° C., and a theoretical combining weight of 444 g.

This product is designated AA.

Example 2

Using the general procedure of Example 1, 162.1 (1.29 eq.) of N,N,N',N'-tetraglycidyl-4,4-diaminodiphenylmethane, 293.6 g (1.54 eq.) of 2,2-bis(4-glycidyloxyphenyl)propane, 768.6 g (6.74 eq.) of bisphenol A, and 40 ppm of 2-isopropylimidazole are reacted. The addition product is characterized by an ICI viscosity at 200° C. of 720 cP, a melting point of 90° C., and a theoretical combining weight of 308 g.

This product is designated BB.

Example 3

Using the general procedure of Example 1, 112.2 g. (0.60 eq.) of 1,1,2,2-tetrakis(p-glycidyloxyphenyl)ethane, 152.0 g (0.80 eq.) of 2,2-bis(4-glycidyloxyphenyl)propane, 364.8 g (3.2 eq.) of bisphenol A, and 40 ppm of 2-isopropylimidazole are reacted. The addition product is characterized by an ICI viscosity at 200° C. of 1027 cP, a melting point of 100° C. and a theoretical combining weight of 349 g.

This addition product is designated CC.

Example 4

Using the general procedure of Example 1, 122 g (1 eq.) of cresol novolac resin hardener HT 9490 (n=3.1), 228 g (2 eq.) of bisphenol A, 188 g (1 eq.) of 2,2-bis(4-glycidyloxyphenyl)propane, and 40 ppm of 2-isopropylimidazole are reacted. The addition product is characterized by a Gardner-Holdt viscosity at 25° C. of U, a melting point of 95°–96° C. and a theoretical combining weight of 269 g.

This addition product is designated DD.

PREPARATION OF CURED EPOXY RESINS USING THE HYDROXYL TERMINATED CURING AGENTS

Example 5

The product AA, prepared in Example 1, is used as a multifunctional hydroxy terminated curing agent in an epoxy resin formulation as is seen below.

| Component Material | g |
| --- | --- |
| 1,1,2,2-tetrakis(p-glycidyloxyphenyl)ethane | 44.1 |
| AA | 88.2 |
| Flow Aid ("MODAFLOW", Monsanto)* | 2.25 |
| 2-methylimidazole | 0.3 |
| Red Iron Oxide | 15.0 |

*"MODAFLOW" flow control agent or flow aid is a poly(2-ethylhexyl acrylate) sold by Monsanto.

This formulation is 2-roll milled at 70° C. for 6 minutes. The melt mixed formulation is then cooled, ground, sieved through a 140 mesh screen (105 microns maximum size), and applied by electrostatic techniques to cold rolled steel panels. These coated test panels are then tested for their physical characteristics as is seen in Example 14.

This formulation is designated EE.

Example 6

As a control, a difunctional hydroxy terminated curing agent, similar to those described in U.S. Pat. No. 3,931,109, is used as a curing agent in an epoxy resin formulation. The difunctional curing agent is prepared by the reaction of two equivalents of bisphenol A with one equivalent of 2,2-bis(4-glycidyloxyphenyl)propane and is designated DFCA.

The epoxy resin control formulation is as follows.

| Component Material | g |
|---|---|
| 1,1,2,2-tetrakis(p-glycidyloxyphenyl)ethane | 78.75 |
| DFCA | 55.18 |
| Flow Aid | 1.125 |
| Red Iron Oxide | 15.0 |

This formulation is processed and applied as in Example 5. The resulting coated panels are then used for testing of physical characteristics as seen in Examples 14 and 18.

This formulation is designated FF.

EXAMPLE 7

Product AA, prepared in Example 1, is formulated with a commercially available solid bisphenol A-based epoxy resin GT 7013. The formulation is as follows:

| Component Material | g |
|---|---|
| GT 7013 | 50.5 |
| AA | 27.5 |
| Flow Aid ("MODAFLOW") | 1.5 |
| 2-methylimidazole | 0.5 |
| Red Iron Oxide | 15.0 |

The formulation is processed and applied as in Example 5 and the resulting coated panels are tested for physical characteristics as seen in Example 16.

This formulation is designated GG.

EXAMPLE 8

Product DFCA, described in Example 6, is formulated with a commercially available solid bisphenol A-based epoxy resin GT 7013. The formulation is as follows:

| Component Material | g |
|---|---|
| GT 7013 | 57.4 |
| DFCA | 21.1 |
| Flow Aid ("MODAFLOW") | 1.5 |
| Red Iron Oxide | 15.0 |

The formulation is processed and applied as in Example 5 and the resulting coated panels are tested for physical characteristics as seen in Examples 16, 17 and 19.

This formulation is designated HH.

EXAMPLE 9

Product BB, prepared in Example 2, is formulated in combination with a commercially available solid bisphenol A-based epoxy resin GT 7013. The formulation is as follows:

| Component Material | g |
|---|---|
| GT 7013 | 90.8 |
| BB | 41.7 |
| Flow Aid ("MODAFLOW") | 2.25 |
| 2-methylimidazole | 0.3 |
| Red Iron Oxide | 15.0 |

The formulation is processed and applied as in Example 5 and the resulting coated panels are tested for physical characteristics as seen in Examples 17.

This formulation is designated II.

EXAMPLE 10

Product CC, prepared in Example 3, is formulated in combination with commercially available solid epoxy resin 1,1,2,2-tetrakis(p-glycidyloxyphenyl)ethane. The formulation is as follows:

| Component Material | g |
|---|---|
| 1,1,2,2-tetrakis(p-glycidyloxyphenyl)ethane | 46.2 |
| CC | 86.25 |
| Flow Aid ("MODAFLOW") | 2.25 |
| 2-methylimidazole | 0.3 |
| Red Iron Oxide | 15.0 |

The formulation is processed and applied as in Example 5 and the resulting coated panels are tested for physical characteristics as seen in Examples 18.

This formulation is designated JJ.

EXAMPLE 11

Product DD, prepared in Example 4, is formulated in combination with commercially available solid bisphenol A-based epoxy resin GT 7013. The formulation is as follows:

| Component Material | g |
|---|---|
| GT 7013 | 100.0 |
| DD | 39.0 |
| Flow Aid ("MODAFLOW") | 2.5 |
| 2-methylimidazole | 0.3 |
| TiO$_2$ | 28.0 |

The formulation is processed and applied as in Example 5 and the resulting coated panels are tested for physical characteristics as seen in Example 19.

This formulation is designated KK.

EXAMPLE 12

Product AA, prepared in Example 1, is formulated in combination with 1,1,2,2-tetrakis(p-glycidyloxyphenyl)ethane and the commercially available solid bisphenol A-based epoxy resin GT 7013. The formulation is as follows:

| Component Material | g |
|---|---|
| GT 7013 | 26.5 |
| 1,1,2,2-tetrakis(p-glycidyloxyphenyl)ethane | 53.25 |
| AA | 56.6 |
| Flow Aid ("MODAFLOW") | 2.25 |
| 2-methylimidazole | 0.3 |
| Red Iron Oxide | 15.0 |

The formulation is processed and applied as in Example 5 and the resulting coated panels are tested for physical characteristics as seen in Example 15.

This formulation is designated LL.

EXAMPLE 13

A formulation based on the difunctional DFCA curing agent, described in Example 6, is formulated with 1,1,2,2-tetrakis(p-glycidyloxyphenyl)ethane and solid bisphenol A-based epoxy resin GT 7013. The formulation is as follows:

| Component Material | g |
|---|---|
| GT 7013 | 21.75 |
| 1,1,2,2-tetrakis(p-glycidyloxyphenyl)ethane | 43.5 |
| DFCA | 57.2 |
| Flow Aid ("MODAFLOW") | 2.25 |
| Red Iron Oxide | 15.0 |

This formulation is processed and applied as in Example 5 and the resulting coated panels are tested for physical characteristics as seen in Example 15.

This formulation is designated MM.

TESTING OF EPOXY RESINS CURED WITH HYDROXYL TERMINATED CURING AGENTS

Chemical resistance testing is conducted at both room temperature (23° C.) and at elevated temperatures (refluxing temperatures for various solvents). Sand blasted cold rolled steel panels and 1.27 cm round stock are the substrates for the testing. The films range in thickness from 3 to 4 mils (0.076 to 0.102 mm) on the panels and 12 to 16 mils (0.305 to 0.406 mm) on the rods. The substrates are powder coated by electrostatic spray techniques at room temperature for the thinner films and at 200° C. for the thicker films.

In order to demonstrate the superiority of the products of this invention, aggressive solvents and elevated temperatures are used. Some or all of the following solvents are employed to demonstrate the utility of the invention:

Acetic acid (10%)
Methyl ethyl ketone (MEK)
Ethanol
Methylene chloride
Acetone
Refluxing 10% sulfuric acid
Refluxing sodium hydroxide solution (pH=13.5)
Boiling water
Refluxing MEK Failures are evidenced by blister formation, delamination, softening to substrate, or total destruction of the coating.

EXAMPLE 14

| PHYSICAL TEST RESULTS | | |
|---|---|---|
| Formulation | EE | FF (control) |
| Contains | AA | DFCA |
| Gel @ 171° C. | 44 sec. | 85 sec. |
| Cure Schedule | 30 min. @ 200° C. | 30 min. @ 200° C. |
| Appearance | Smooth | Smooth |
| Thickness | 3.3 to 3.5 mils | 3.0 to 3.2 mils |
| | (0.084 to 0.089 mm) | (0.076 to 0.081 mm) |
| Closed Direct Impact | >160 inch-lbs. | >160 inch-lbs. |
| | (>1.76 Kg m) | (>1.76 Kg m) |
| Mandrel Bend | Pass ½ inch | Pass ⅛ inch |
| | (12.7 mm) | (3.2 mm) |

| CHEMICAL TEST RESULTS | | |
|---|---|---|
| Thickness 3.0 to 3.3 mils (0.076 to 0.084 mm) | | |
| Acetic Acid (10%) | >35 days | >35 days |
| Methyl Ethyl Ketone | >35 days | <1 day |
| Ethanol | >35 days | <1 day |
| Methylene Chloride | >35 days | <1 day |
| Acetone | >35 days | <1 day |
| Refluxing (MEK) | 24 days | <5 minutes |

EXAMPLE 15

| PHYSICAL TEST RESULTS | | |
|---|---|---|
| Formulation | LL | MM (control) |
| Contains | AA | DFCA |
| Gel @ 171° C. | 49 sec. | 86 sec. |
| Cure Schedule | 30 min @ 200 ° C. | 30 min. @ 200° C. |
| Appearance | Smooth | Smooth |
| Thickness | 3 mils | 3 mils |
| | (0.076 mm) | (0.076 mm) |
| Closed Direct Impact | >160 inch-lbs. | >160 inch-lbs. |
| | (>1.76 Kg m) | (>1.76 Kg m) |
| Mandrel Bend | Pass ⅛ inch | Pass ⅛ inch |
| | (3.2 mm) | (3.2 mm) |

| CHEMICAL TEST RESULTS | | |
|---|---|---|
| Thickness 12-16 mils (0.305 to 0.406 mm) | | |
| Boiling H₂O | >90 days | 16 days |
| Refluxing H₂SO₄ (10%) | >90 days | 42 days |
| Refluxing NaOH (pH = 13.5) | >14 days | 5 days |

EXAMPLE 16

| PHYSICAL AND CHEMICAL TEST RESULTS | | |
|---|---|---|
| Formulation | GG | HH (control) |
| Contains | AA | DFCA |
| Cure Schedule | 30 min. @ 200° C. | 30 min. @ 200° C. |
| Appearance | Smooth | Smooth |
| Thickness | 2.0-2.2 mils | 2.0-2.5 mils |
| | (0.0508-0.056 mm) | (0.0508-0.0635 mm) |
| Open Reverse Impact | >160 inch-lbs. | >160 inch-lbs. |
| | (>1.76 Kg m) | (>1.76 Kg m) |
| Mandrel Bend | Pass ⅛ inch | Pass ⅛ inch |
| | (3.2 mm) | (3.2 mm) |
| Methyl Ethyl Ketone | 5 min. | 5 min. |
| Refluxing H₂SO₄ (10%) | 76 hours | 30 min. |

EXAMPLE 17

| PHYSICAL AND CHEMICAL TEST RESULTS | | |
|---|---|---|
| Formulation | II | HH (control) |
| Contains | BB | DFCA |
| Cure Schedule | 30 min. @ 200° C. | 30 min. @ 200° C. |
| Appearance | Smooth | Smooth |
| Thickness | 3.0 mils | 2.0-2.5 mils |
| | (0.076 mm) | (0.0508 to 0.0635 mm) |
| Open Reverse Impact | >160 inch-lbs. | >160 inch-lbs. |
| | (>1.76 Kg m) | (>1.76 Kg m) |
| Mandrel Bend | Pass ⅛ inch | Pass ⅛ inch |
| | (3.2 mm) | (3.2 mm) |
| Methyl Ethyl Ketone | 6 hours | 5 min. |
| Refluxing H₂SO₄ (10%) | 174 hours | 30 min. |

EXAMPLE 18

| PHYSICAL AND CHEMICAL TEST RESULTS | | |
|---|---|---|
| Formulation | JJ | FF (control) |
| Contains | CC | DFCA |
| Cure Schedule | 30 min. @ 200° C. | 30 min. @ 200° C. |
| Appearance | Smooth | Smooth |
| Thickness | 3.2–3.5 mils | 3.0–3.2 mils |
| | (0.081–0.089 mm) | (0.076–0.081 mm) |
| Closed Direct Impact | >160 inch-lbs. | >160 inch-lbs. |
| | (>1.76 Kg m) | (>1.76 Kg m) |
| Mandrel Bend | Pass ⅛ inch | Pass ⅛ inch |
| | (3.2 mm) | (3.2 mm) |
| Methyl Ethyl Ketone | >14 days | <5 min. |

EXAMPLE 19

| PHYSICAL AND CHEMICAL TEST RESULTS | | |
|---|---|---|
| Formulation | KK | HH (control) |
| Contains | DD | DFCA |
| Cure Schedule | 30 min. @ 200° C. | 30 min. @ 200° C. |
| Appearance | Smooth | Smooth |
| Thickness | 2.2 mils | 2.0–2.5 mils |
| | (0.056 mm) | (0.0508–0.0635 mm) |
| Closed Direct Impact | >160 inch-lbs. | >160 inch-lbs. |
| | (>1.76 Kg m) | (>1.76 Kg m) |
| Methyl Ethyl Ketone | 1 day | 5 min. |

EXAMPLE 20

In order to ascertain the influence of stoichiometry on curing epoxy resins with the hydroxyl terminated hardeners of this invention and with the objective of delineating the area where flexibility and chemical resistance of the cured products would be maximized, a series of runs are carried out using the hardener product AA prepared in Example 1 with the epoxy resin formulations similar to LL described in Example 12 with the equivalent ratio of epoxy groups of the epoxy resin to the phenolic hydroxyl groups of the hardener ranging from 1:0.4 to 1:1.2. The results of these runs are seen in the table below where the physical properties of the films prepared from the cured compositions are delineated.

These results show that physical properties of the cured products reach a maximum in terms of impact strength (toughness) and flexibility when the ratio of equivalents of epoxy to hydroxyl is in the region of 1:0.5 to 1:0.8 and particularly at about 1:0.65 to 1:0.75.

agent of the prior art, with relatively short distances between phenolic hydroxyl moieties therein, on the physical properties, such as adhesion, flexibility and chemical resistance, of an epoxy resin formulation cured thereby is seen by inspection of the data given below.

An epoxy resin formulation based on 1,1,2,2-tetrakis-(p-glycidyloxyphenyl)ethane is cured using either the instant hardener of Example 1 (the product AA) or the prior art hardener having the structure

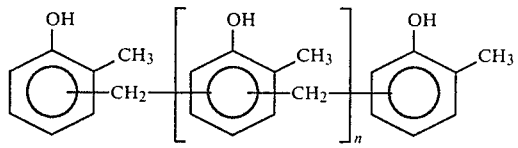

where n is 2 to 4, designated as hardener HT.

The respective formulations are designated (A) and (B) as given below. Each formulation has one equivalent of epoxy to one equivalent of epoxy to one equivalent of phenolic hydroxyl.

| Formulation A | |
|---|---|
| | Weight Grams |
| 1,1,2,2-tetrakis-(p-glycidyl-oxyphenyl)ethane | 44.1 |
| Product AA | 88.2 |
| Flow Aid ("MODAFLOW") | 2.25 |
| 2-methylimidazole | 0.3 |
| Red Iron Oxide | 15.0 |

| Formulation B | |
|---|---|
| 1,1,2,2-tetrakis-(p-glycidyl-oxyphenyl)ethane | 87.75 |
| Product HT | 44.7 |
| Flow Aid ("MODAFLOW") | 2.25 |
| 2-methylimidazole | 0.3 |
| Red Iron Oxide | 15.0 |

These two formulations are then processed and applied as seen in Example 5 and the resulting coated panels are tested for chemical resistance as seen in Example 14 and for physical characteristics as seen in Example 15.

These test data are given in the following table.

| Equivalent Ratio Hydroxyl/Epoxy | 0.4/1.0 | 0.5/1.0 | 0.6/1.0 | 0.7/1.0 | 0.8/1.0 | 0.9/1.0 | 1.0/1.0 | 1.1/1.0 | 1.2/1.0 |
|---|---|---|---|---|---|---|---|---|---|
| Thickness (mils.) | 2.0 | 3.0 | 3.0 | 3.0 | 3.0 | 3.0 | 3.0 | 3.0 | 3.0 |
| (mm) | 0.0508 | 0.076 | 0.076 | 0.076 | 0.076 | 0.076 | 0.076 | 0.076 | 0.076 |
| Impact (in.-lbs.) | >20 | 120–140 | 140–160 | >160 | 60 | <20 | <20 | <20 | <20 |
| (Kg m) | <0.22 | 1.32–1.54 | 1.54–1.76 | >1.76 | 0.66 | <0.22 | <0.22 | <0.22 | <0.22 |
| Mandrel Bend (⅛ inch) (3.2 mm) | Cracks | Pass | Pass | Pass | Cracks | Cracks | Cracks | Cracks | Cracks |
| MEK (Immersion - Room Temperature) | <7 hrs. softens | NC* | NC* | NC* | NC* | NC* | 19 hrs. softens | <7 hrs. softens | <7 hrs. softens |

*NC—No change after 8 weeks exposure.

EXAMPLE 21

The effect of using an instant multifunctional hydroxy terminated curing agent, with relatively large distances between phenolic hydroxyl moieties, in contrast to a multifunctional hydroxy terminated curing

| SOLVENT RESISTANCE AND PHYSICAL TEST RESULTS | | | | |
|---|---|---|---|---|
| | Formulation | Formulation | Sample Thickness | |
| SOLVENT | A (Cured) | B (Cured) | mils | mm |
| MEK | 40 days NC | 40 days NC | 2.0–2.5 | 0.0508–0.0635 |

-continued

| SOLVENT RESISTANCE AND PHYSICAL TEST RESULTS | | | | |
|---|---|---|---|---|
| (Room Temperature) | | | | |
| Ethanol | 40 days NC | 40 days NC | 2.0–2.5 | 0.0508–0.0635 |
| Methylene Chloride | 40 days NC | 40 days NC | 2.0–2.5 | 0.0508–0.0635 |
| 10% Acetic Acid | 40 days NC | 40 days NC | 2.0–2.5 | 0.0508–0.0635 |
| Acetone | 40 days NC | 14 days - few small blisters | 2.0–2.5 | 0.0508–0.0635 |
| MEK (Refluxing) | 24 days - few small blisters | 120 days NC | 12–14 | 0.305–0.356 |
| H$_2$O (Boiling) | 120 days NC | — | 12–14 | 0.305–0.356 |
| TEST | A | B | | |
| Gel @ 171° C. time | 44 sec. | 55 sec. | | |
| Mandrel Bend | Pass ½ inch (12.7 mm) | >½ inch (>12.7 mm) | | |
| Open Reverse Impact | 20 in.-lbs. (0.22 Kg m) | 2 to 4 inch-lbs (0.022–0.044 Kg m) | | |
| Thickness | 2.0–2.5 mils (0.0508–0.0635 mm) | 2.0–2.5 mils (0.0508–0.0635 mm) | | |
| Cure Schedule | 20 min. @ 200° C. | 30 min. @ 200° C. | | |
| Adhesion (% retention) | Excellent (100%) | Fair-Good (50–70%) | | |

NC = No change
MEK = methyl ethyl ketone

Inspection of the data given on the table shows that the prior art hardener (Formulation B) gives a cured epoxy resin product having appreciably less flexibility, impact resistance and adhesion than the instant hardener (Formulation A). Chemical or solvent resistance is comparable.

These data show that the instant hardeners provide improved physical properties while maintaining good chemical resistance.

What is claimed is:

1. A polyfunctional phenolic hydroxyl terminated hardener product, useful in the curing of epoxy resins, which is the reaction product of
   (a) a polyglycidyl compound of the formula I, II, III or IV, $$T_1[-N(glycidyl)_2]_2, \quad (I)$$

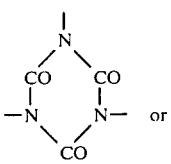
   , $$T_3(-O-glycidyl)_{3 \text{ or } 4} \text{ or} \quad (III)$$

$$T_4(glycidyl)_3 \quad (IV)$$

wherein
   T$_1$ is 1,2-phenylene, 1,3-phenylene, 1,4-phenylene or

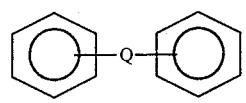

where Q is alkylene of 1 to 6 carbon atoms, alkylidene of 2 to 6 carbon atoms, —SO$_2$—, —SO—, —S—, —S—S—, —O— or —CO—,
   T$_2$ is 1,2-phenylene, 1,3-phenylene or 1,4-phenylene,
   T$_3$ is 1,2,3-benzenetriyl, 1,2,4-benzenetriyl, 1,3,5-benzenetriyl or

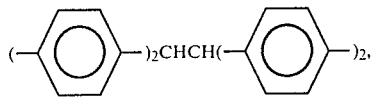

T$_4$ is

where G$_1$ and G$_2$ are independently alkyl of 1 to 6 carbon atoms or are together alkylene of 4 to 5 carbon atoms, and
   (b) a diglycidyl compound of the formula glycidyl—O—E—O—glycidyl where
   E is 1,2-phenylene, 1,3-phenylene, 1,4-phenylene or

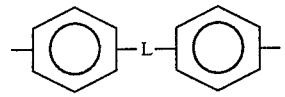

where L is a direct bond, alkylene of 1 to 6 carbon atoms or alkylidene of 2 to 6 carbon atoms, wherein the ratio of equivalents of polyglycidyl compound (a) to diglycidyl compound (b) is from 1 to 4 to 1 to 1, with
   (c) a bisphenol of the formula

HO—E$_1$—OH where E$_1$ has the same definitions as E, but is independent of E, wherein the ratio of equivalents of bisphenol component (c) to the total equivalents of glycidyl compounds (a) plus (b) is from 1.8 to 1 to 2.4 to 1, and where each glycidyl group is effectively endcapped with a moiety containing a free phenolic hydroxyl group by reaction of components (a) and (b) with (c) in the presence of an effective amount of a catalyst for promoting said reaction at a temperature between 120° and 300° C.

2. A product according to claim 1 wherein T$_1$ is 1,3-phenylene, 1,4-phenylene or

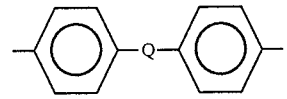

where Q is methylene or —O—.

3. A product according to claim 2 wherein Q is methylene.

4. A product according to claim 1 wherein $T_2$ is 1,4-phenylene.

5. A product according to claim 1 wherein $T_3$ is

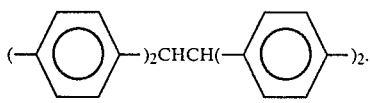

6. A product according to claim 1 wherein $T_4$ is

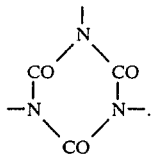

7. A product according to claim 1 wherein E is

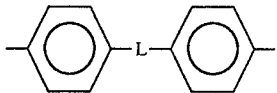

where L is isopropylidene.

8. The product according to claim 1 wherein $E_1$ is

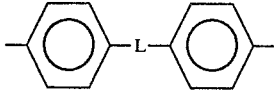

where L is isopropylidene.

9. A product according to claim 1 wherein $T_1$ is

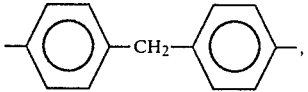

and E and $E_1$ are both

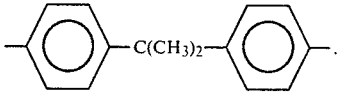

10. A product according to claim 1 wherein $T_2$ is 1,4-phenylene, and E and $E_1$ are both

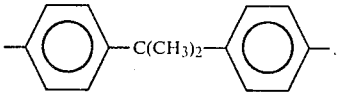

11. A product according to claim 1 wherein $T_3$ is

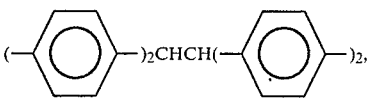

and E and $E_1$ are both

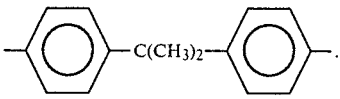

12. A product according to claim 1 made using an imidazole catalyst.

13. A product according to claim 12 wherein the catalyst is 2-isopropylimidazole.

14. A curable composition comprising
(A) a solid epoxy resin having more than one 1,2-epoxy group,
(B) a polyfunctional phenolic hydroxyl terminated hardener product according to claim 1 or mixtures thereof, and
(C) a catalytic amount of a catalyst effective in causing reaction between epoxy groups of (a) and the phenolic hydroxyl groups of (b)
wherein the equivalent ratio of epoxy groups of the epoxy resin of component (A) to the phenolic hydroxyl groups of the hardener of component (b) is from 1:0.4 to 1:1.2.

15. A composition according to claim 14 wherein the ratio is 1:0.65 to 1:0.75.

16. A composition according to claim 14 wherein component (B) is the reaction product of
(a) a polyglycidyl compound of the formula I, II, III or IV, $$T_1[-N(glycidyl)_2]_2, \quad (I)$$

$$T_2\begin{matrix}N(glycidyl)_2\\ \\O-glycidyl\end{matrix} \quad (II)$$

$$T_3(-O-glycidyl)_{3 \text{ or } 4} \text{ or} \quad (III)$$

$$T_4(glycidyl)_3 \quad (IV)$$

wherein
$T_1$ is 1,2-phenylene, 1,3-phenylene, 1,4-phenylene or

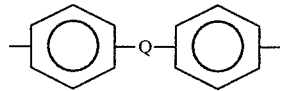

where Q is alkylene of 1 to 6 carbon atoms, alkylidene of 2 to 6 carbon atoms, $-SO_2-$, $-SO-$, $-S-$, $-S-S-$, $-O-$ or $-CO-$,
$T_2$ is 1,2-phenylene, 1,3-phenylene or 1,4-phenylene,
$T_3$ is 1,2,3-benzenetriyl, 1,2,4-benzenetriyl, 1,3,5-benzenetriyl or

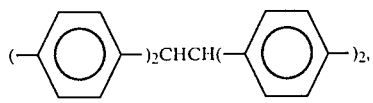

T4 is

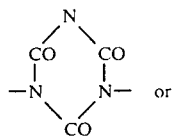 or

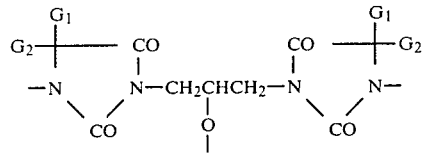

where G₁ and G₂ are independently alkyl of 1 to 6 carbon atoms or are together alkylene of 4 to 5 carbon atoms, and
(b) a diglycidyl compound of the formula

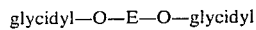

where
E is 1,2-phenylene, 1,3-phenylene, 1,4-phenylene or

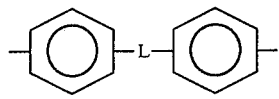

where L is a direct bond, alkylene of 1 to 6 carbon atoms or alkylidene of 2 to 6 carbon atoms, wherein the ratio of equivalents of polyglycidyl compound (b) is from 1 to 4 to 1 to 1, with
(c) a bisphenol of the formula

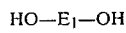

where E₁ has the same definitions as E, but is independent of E, wherein the ratio of equivalents of bisphenol component (c) to the total equivalents of glycidyl compounds (a) plus (b) is from 1.8 to 1 to 2.4 to 1, and where each glycidyl group is effectively endcapped with a moiety containing a free phenolic hydroxyl group by reaction of components (a) and (b) with (c) in the presence of an effective amount of a temperature between 120° and 300° C.

17. A composition according to claim 16 wherein component (B) is the reaction product of a polyglycidyl compound of formula I where T₁ is

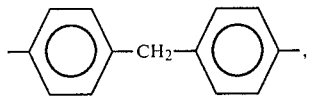

of a diglycidyl compound, and of a bisphenol where E and E₁ are each

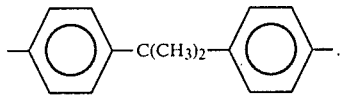

18. A composition according to claim 16 wherein component (b) is the reaction product of a polyglycidyl compound of formula II where T₂ is 1,4-phenylene, of a diglycidyl compound, and of a bisphenol where E and E₁ are both

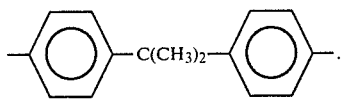

19. A composition according to claim 16 wherein component (b) is the reaction product of a polyglycidyl compound of formula III where T₃ is

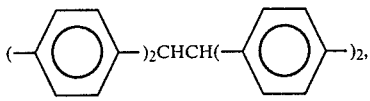

of a diglycidyl compound, and of bisphenol where E and E₁ are both

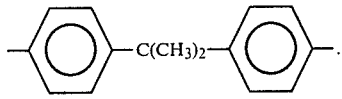

20. A coating prepared by curing the curable composition according to claim 14. 7

* * * * *

UNITED STATES PATENT AND TRADEMARK OFFICE
CERTIFICATE OF CORRECTION

PATENT NO. : 4,526,940

DATED : July 2, 1985

INVENTOR(S) : John P. Seymour and John A. Gannon

It is certified that error appears in the above-identified patent and that said Letters Patent is hereby corrected as shown below:

Claim 14, Column 20, Line 28 should read-- ing reaction between epoxy groups of (A) and the --.

Claim 14, Column 20, Line 29 should read-- phenolic hydroxyl groups of (B) --.

Claim 14, Column 20, Line 32 should read-- groups of the hardener of component (B) is from 1:0.4 to --.

Signed and Sealed this

Third Day of December 1985

[SEAL]

Attest:

Attesting Officer

DONALD J. QUIGG

Commissioner of Patents and Trademarks